United States Patent [19]

Redman

[11] Patent Number: 4,505,178
[45] Date of Patent: Mar. 19, 1985

[54] CHORD HAND CALLUS EXERCISER

[76] Inventor: John W. Redman, 7 Jean Dr., Old Lyme, Conn. 06371

[21] Appl. No.: 426,675

[22] Filed: Sep. 29, 1982

[51] Int. Cl.³ ............................................. G09B 15/06
[52] U.S. Cl. ........................................ 84/465; 84/453
[58] Field of Search ................................. 84/465, 453

[56] References Cited

U.S. PATENT DOCUMENTS 3,738,651   6/1973   Norman et al. ................. 84/465 X
3,756,223   9/1973   Carbone ........................... 84/465 X Primary Examiner—Lawrence R. Franklin
Attorney, Agent, or Firm—John W. Redman

[57] ABSTRACT

Disclosed is a training device useful to people who play guitar or similar stringed instruments. Its main purpose is to build hard callus pads on the ends of the fingers used in chording the guitar. Its secondary purpose is to strengthen the muscles used to press strings against frets. To accomplish the first, the device is provided with raised edges simulating the cross-section and texture of actual guitar strings. To meet the second need, the edges are mounted on a spring loaded button to simulate the give and tension felt in making chords. The entire device is easily held and fits in any pocket or purse.

6 Claims, 4 Drawing Figures

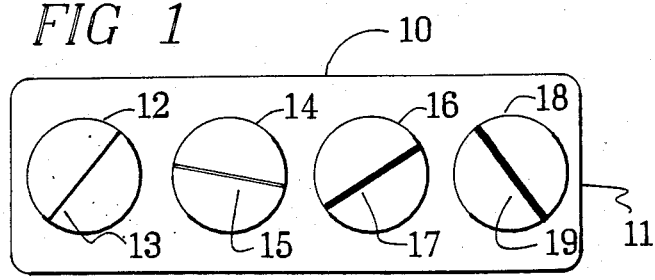
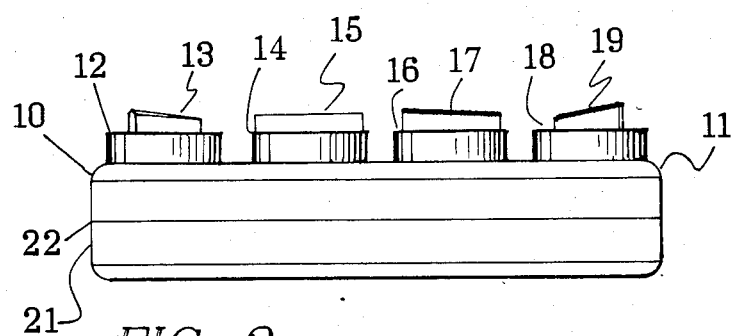
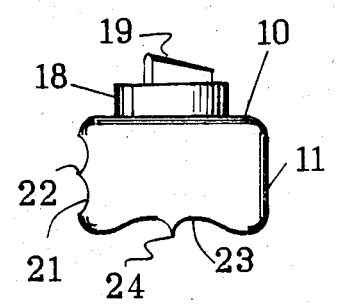
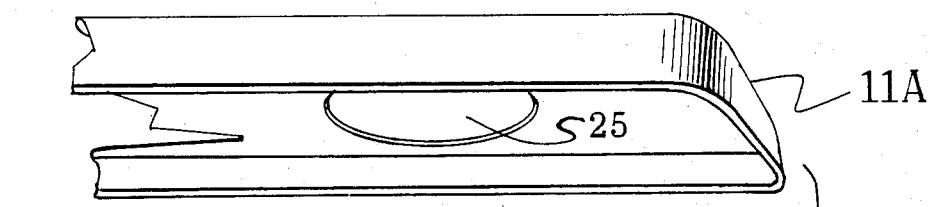
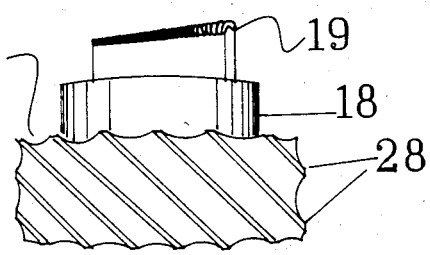
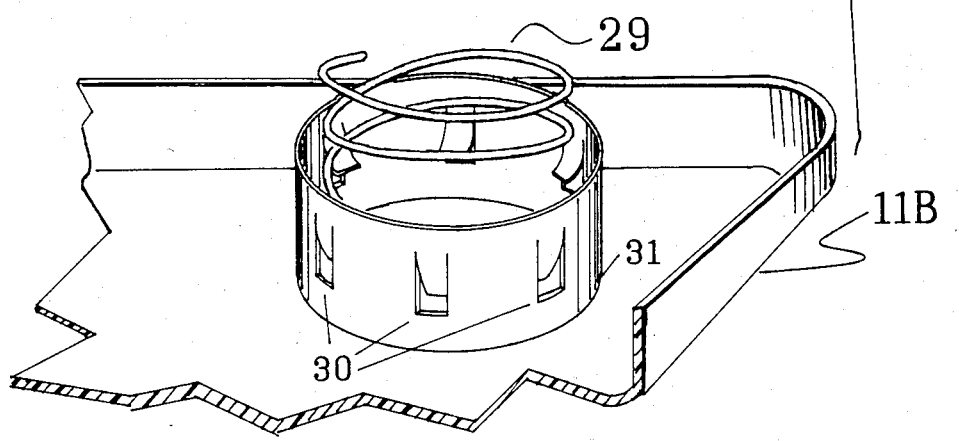

CHORD HAND CALLUS EXERCISER

FIELD OF THE INVENTION

The invention is related to musical instruments, more specifically to training aids for learning to play the guitar.

BACKGROUND OF THE INVENTION

In the past, those learning to play the guitar have had to put in many hours of practice over many days before their chord hand finger muscles and calluses developed sufficient strength and toughness, respectively, such that playing would not be uncomfortable and real learning could progress. Most students with sufficient dedication continue to practice regularly until they reach a plateau in their ability wherein further improvement would demand much more of their time and resources. As far as they then care, they "know how to play". At this point, most people begin to spend much less time playing and, without the stimulation thus provided, the body begins to rid itself of those hard-won calluses. When these are gone, playing becomes somewhat of a painful experience.

SUMMARY OF THE INVENTION

The instant invention has been developed in recognition that most non-professionals cannot or will not spend the time playing the guitar necessary to maintain good calluses. However, most people have enough idle moments in the day to get and keep very thick calluses on their fingers. The problem solved by this invention is to distill part of the essence of guitar playing such that it will be handy for practice. This simple device consists of a four inch long by one inch wide (approximately), shallow rectangular body having four round rotatable and spring loaded depressible buttons along one face thereof. Each of the buttons has, along a diameter thereon, a raised ridge configured like a section of guitar string. A person would hold this device in his hand and by pressing his finger tips against one or more of these buttons at a time, provide the stimulation necessary for the body to build and maintain thick callus pads and strong finger muscles. By shifting this device in the hand, a person can also toughen up the skin along the sides of the index and middle fingers used in bar chording. This latter exercise may be accomplished by the aforementioned buttons or from a ridge in a depression along a different face of the device. It is felt that the buttons would serve their function best if they would automatically rotate slightly when released from their down position.

BRIEF DESCRIPTION OF THE DRAWINGS

FIG. 1 is a top view of the inventive device.
FIG. 2 is a side view of the exercisor.
FIG. 3 is an end view.
FIG. 4 is an exploded view in the area of one button.

DETAILED DESCRIPTION OF THE PREFERRED EMBODIMENT

FIG. 1 shows device 10 with the four buttons 12, 14, 16 and 18, raised ridges 13, 15, 17 and 19 and case 11. Note that the ridges can be made to correspond in width and texture to (as shown) the first, third, fourth and sixth strings of the guitar.

FIG. 2 is a side view showing the four buttons 12, 14, 16 and 18 as well as an embodiment of a non depressable groove 21 and ridge 22 useful for developing calluses along the length of the middle and index fingers for bar chords.

FIG. 3 is an end view showing two possible locations for a bar chording ridge, 21-22 shown in FIG. 2 and groove 23 and ridge 24 running along the bottom of case 11.

FIG. 4 is an exploded view of the components in the area of one of the buttons showing a contemplated mechanism for causing the button to rotate slightly when released from a depressed position. The case is shown divided into halves 11a and 11b, 11a having a hole 25 large enough to pass the upper portion of button 18 and smaller than seat portion 26, limiting the uppermost extension of button 18. Below seat 26 are shown helical gear-like teeth 28. As button 18 is urged downward against spring 29, teeth 28 pass over pawls 30 which extend from the wall of cylindrical button retainer 31 in a ratcheting action. As finger pressure against button 18 is released, the upward movement imparted by spring 29 will allow pawls 30 to engage teeth 28 and cause a slight, depending on the pitch of teeth 28, rotation to button 18.

Some sort of strap (not shown) should be attached to the device 10 such that it either is held along the ball of the thumb or across the end of the thumb, the former being easier to achieve, the latter more closely simulating the recommended chord hand position.

Having thus revealed my invention, I claim:

1. A device for exercising finger muscles and building finger tip calluses comprising:
   edge means for stimulating callus building in a portion of skin repeatedly pressed against said edge means;
   resistance means movable between two positions and having a bias toward one of said two positions for mounting said edge means and providing a muscle exercise function to said device; and,
   body means sized to fit into the palm of a human hand for mounting said resistance means.

2. The device of claim 1 wherein said resistance means and said edge means comprise four in number.

3. The device of claim 2 wherein said body means is rectangular and said resistance means and said edge means are equally spaced with respect to one another and spread along a long axis on one face of said body means.

4. The device of claim 2 further comprising means for imparting increments of rotational displacement between said resistance means and said body means.

5. The device of claim 4 wherein said means for imparting rotation functions automatically during one cycle of movement between said two positions.

6. The device of claim 5 further comprising additional edge means centered in a depression provided on a second face of said body.

* * * * *